United States Patent [19]
Gawne et al.

[11] 4,011,284
[45] Mar. 8, 1977

[54] PROCESS FOR THE MANUFACTURE OF IMPACT-RESISTANT POLYVINYL AROMATIC COMPOUND

[75] Inventors: George Gawne, Amsterdam; Cornelis Ouwerkerk, The Hague, both of Netherlands

[73] Assignee: Shell Oil Company, Houston, Tex.

[22] Filed: June 25, 1975

[21] Appl. No.: 590,178

[30] Foreign Application Priority Data

June 25, 1974 United Kingdom ............ 28128/74

[52] U.S. Cl. ............................. 260/880 R; 526/65
[51] Int. Cl.² ......................................... C08L 9/06
[58] Field of Search ................... 260/880 R, 95 C; 526/65

[56] References Cited
UNITED STATES PATENTS

| | | |
|---|---|---|
| 3,311,675 | 3/1967 | Doak ............................. 260/880 R |
| 3,513,145 | 5/1970 | Crawford ....................... 260/880 R |
| 3,639,372 | 2/1972 | Haynes ............................ 260/95 C |
| 3,658,946 | 4/1972 | Bronstert ....................... 260/878 R |
| 3,664,977 | 5/1972 | Nakanishi ....................... 260/880 R |
| 3,903,202 | 9/1975 | Carter ............................. 260/880 R |

FOREIGN PATENTS OR APPLICATIONS 1,175,262 12/1969 United Kingdom

*Primary Examiner*—Paul R. Michl

[57] ABSTRACT

A continuous process is described for the manufacture of impact-resistant polyvinyl-aromatic compounds by the bulk polymerization of a vinyl-aromatic monomer in admixture with an elastomeric polymer and in the optional presence of up to 20% by weight of hydrocarbon diluent, calculated on starting vinyl-aromatic monomer. The resulting polyvinyl-aromatic compounds are also described.

7 Claims, 1 Drawing Figure

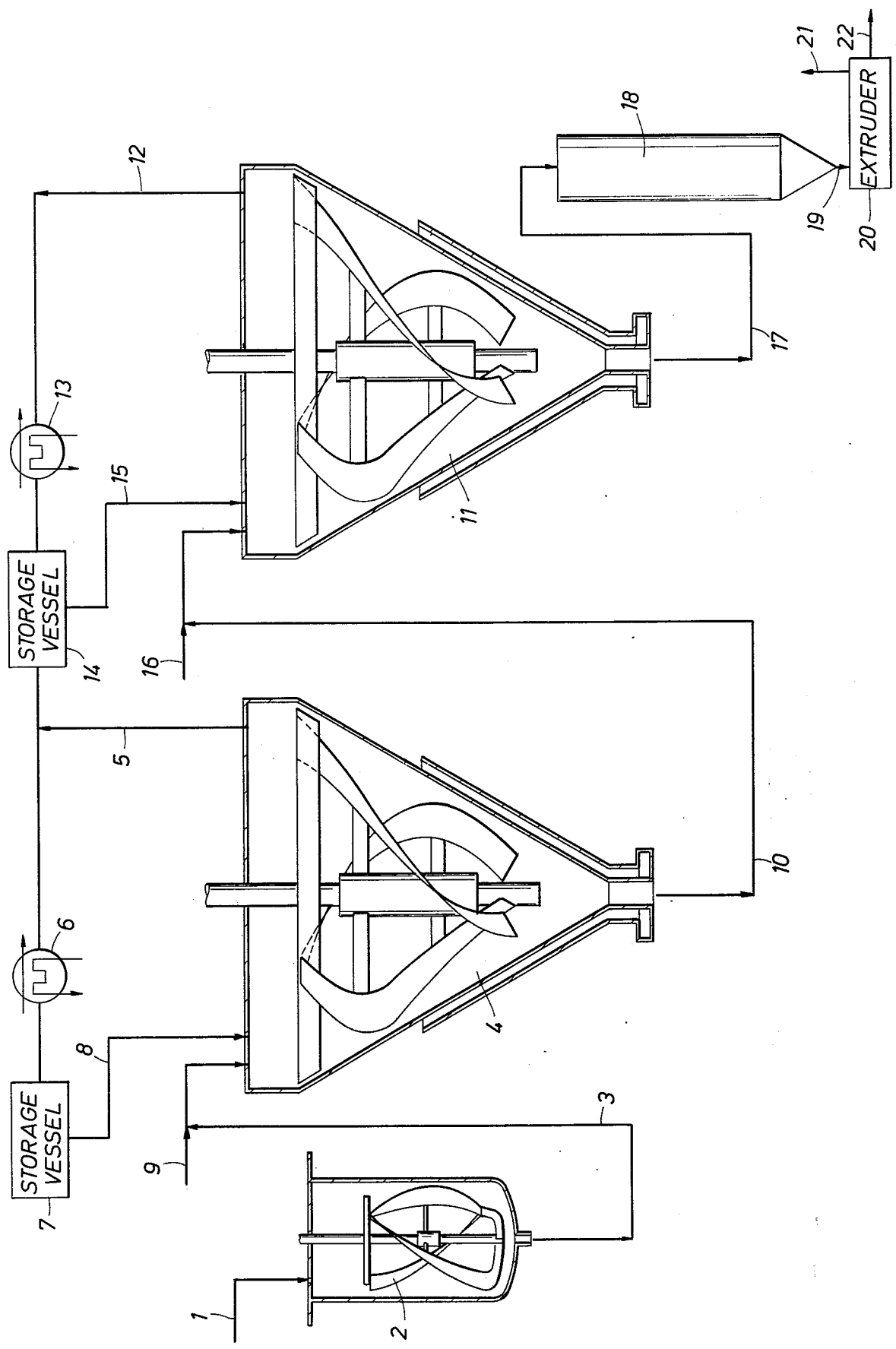

PROCESS FOR THE MANUFACTURE OF IMPACT-RESISTANT POLYVINYL AROMATIC COMPOUND

BACKGROUND OF THE INVENTION

The impact resistance, being the ability to absorb the energy of a high-speed blow without breaking, is a property of great technological importance. The "Encyclopedia of Polymer Science and Technology," Volume 13 (1970), Interscience Publishers, pp.193–195, discloses that polyvinylaromatic compounds, such as polystyrene, have improved toughness — or so-called "impact resistance" — when a small amount of unvulcanized elastomeric polymer is incorporated therewith. A phase containing the elastomeric polymer is dispersed in a continuous phase of the polyvinyl-aromatic compound. This dispersed phase is, in effect, frozen as uniformly or substantially uniformly dispersed particles in the continuous phase and is responsible for the improved toughness.

The word "polymerization" is used herein to include copolymerization. The words "vinyl-aromatic monomer" are used herein to include aromatic compounds of which the vinyl group is attached directly to the aromatic nucleus. The words "polyvinyl-aromatic compound" are used herein to mean the vinyl polymerization product of the vinyl-aromatic monomer, i.e., polystyrene from styrene.

The elastomeric polymer present in the impact-resistant polyvinyl-aromatic compound is cross-linked and grafted with polyvinyl-aromatic compound to a greater or lesser extent. An impact-resistant polyvinyl-aromatic compound is usually judged by its Izod impact strength, softening point and melt index. The Izod impact strength gives an impression of the ability to absorb the energy of a high-speed blow. The melt index is a rapid control tool for evaluating constancy of the polymer flow behavior in the manufacture of the polymer is long as major changes are not made in the process. The molecular structure of an impact-resistant polyvinyl-aromatic compound is usually judged by its gel content, the content of elastomeric polymer — the so-called rubber content — and the gel/rubber ratio derived therefrom, the swell index and the intrinsic viscosity. The gel content is the percentage by weight of the insoluble constituent of the polyvinyl-aromatic compound, after extraction with toluene, calculated on total polyvinyl-aromatic compound. The gel content indicates the degree of grafting of the elastomeric polymer with vinyl-aromatic monomer and the degree of cross-linking of the elastomeric polymer and is also a measure of the amount of polyvinyl-aromatic compound occluded in the dispersed particles. The rubber content is the rubber content of the starting solution. The gel/rubber ratio influences the Izod impact strength: An increase in gel/rubber ratio is usually accompanied by a higher Izod impact strength at constant content of elastomeric polymer. The swell index is the ratio of the weight of the gel swollen in toluene to the weight of dry, toluene-free, gel. The swell index is an approximate measure of the degree of cross-linking of the dispersed elastomeric polymer. Toughened polystyrene of good quality usually has a swell index between 9 and 16. The intrinsic viscosity is determined at 25° C on the toluene extract obtained from the measurement of the gel content. The logarithm of the intrinsic viscosity is a linear function of the logarithm of the average molecular weight of the continuous phase.

British Pat. Specification No. 1,175,262 discloses a continuous process for the manufacture of an impact-resistant polyvinyl-aromatic compound by the bulk polymerization of a vinyl-aromatic monomer in admixture with an elastomeric polymer and in the optional presence of a minor amount of hydrocarbon diluent by polymerization of the vinyl-aromatic monomer in a plurality of polymerization zones interconnected in series, said zones comprising a pre-polymerization zone (as herein defined), an agitated intermediate zone in which the reaction mixture is maintained substantially homogeneous and heat of polymerization is removed therefrom by the evaporation of vinyl-aromatic monomer and of hydrocarbon diluent (when present), and a final polymerization zone in which polymerization is completed to a desired degree of conversion under substantially adiabatic, plug-flow conditions.

The polymerization is started in the pre-polymerization zone with a homogeneous solution of the elastomeric polymer in the vinyl-aromatic monomer. Almost as soon as polymerization starts, a polystyrene phase separates from the solution, giving rise to a discontinuous phase consisting of droplets of polyvinyl-aromatic compound dissolved in vinyl-aromatic monomer, and a continuous phase consisting of elastomeric polymer dissolved in vinyl-aromatic monomer. As the polymerization proceeds, the volume fraction of the polyvinyl-aromatic compound-in-vinyl-aromatic monomer phase increases relative to that of the elastomeric polymer in vinyl-aromatic monomer. At about equal volume fractions, phase inversion occurs, when agitating is sufficiently vigorous to overcome the influence of high viscosity of the system tending to impede inversion. After phase inversion, the solution of elastomeric polymer vinyl-aromatic monomer is the discontinuous phase suspended in a solution of polyvinyl-aromatic compound in vinyl-aromatic monomer. The pre-polymerization zone is defined as the zone in which this phase inversion is performed.

An essential feature of the above-mentioned agitated intermediate zone is the operation under substantially fully "back-mixed" conditions. In order to achieve back-mixed conditions, i.e., efficient intermixing of the reaction mass, the intermediate reactor is provided with an agitator which is of such a size and shape in relation thereto that the agitation of the reaction mass induced by the evaporation of monomer (or monomer and added diluent, when a diluent is used in the process) therefrom is augmented to the extent required to avoid local overheating of the reaction mass. In this way the problem of temperature control of the reaction mass has been met.

An essential feature of the final polymerization zone is the operation under substantially adiabatic, plug-flow conditions, the words "plug-flow" indicating laminar flow (in the absence of intermixing) and no channelling in the reaction mass. Channelling would lead to wide variations in the characteristics of the ultimate polymer product.

U.S. Pat. No. 3,658,946 issued Apr. 25, 1972 to K. Bronstert et al describes a similar process but incorporates two reactors in the pre-polymerization stage in order to control the size of the gel particles. The two pre-polymerization reactors are operated isothermally, the total conversion over the two reactors being held below 50% while the conversion in the first reactor is held below 16%. Here, as in the aforementioned process, the intermediate stage is composed of one reactor.

DESCRIPTION OF THE INVENTION

The present invention provides an improvement of the abovedescribed known process which results in a considerably higher impact strength of the impact-resistant polyvinyl-aromatic compound for the same or a lower content of elastomeric polymer or the same impact strength for a lower content of elastomeric polymer.

The invention may be defined as relating to a continuous process for the manufacture of an impact-resistant polyvinyl-aromatic compound by the bulk polymerization (as herein defined) of a vinyl-aromatic monomer in admixture with an elastomeric polymer and in the optional presence of up to 20% by weight of hydrocarbon diluent, calculated on starting vinyl-aromatic monomer, in which process polymerization of the vinyl-aromatic monomer is effected in a plurality of polymerization zones inter-connected in series, said zones comprising a pre-polymerization zone, at least two agitated intermediate zones in which the reaction mixture is maintained substantially homogeneous and heat of polymerization is removed therefrom by evaporation of vinyl-aromatic monomer and of hydrocarbon diluent (when present), and a final polymerization zone in which polymerization is performed under substantially adiabatic, plug-flow conditions.

This improvement due to the use of at least two intermediate zones in series, may be explained by the following. The single intermediate zones applied in the above-described known processes contain a substantially homogeneous reaction mass in which the overall conversion of vinyl-aromatic monomer is, for example 85%. The non-converted vinyl-aromatic monomer, being, for example, 15%, is present in the discontinuous phase of elastomeric polymer and vinyl-aromatic monomer and in the continuous phase of polyvinyl-aromatic compound and vinyl-aromatic monomer. The conversion of the vinyl-aromatic monomer in the mixture withdrawn from the pre-polymerization zone is much lower, for example 25%. When the latter, low-converted mixture comes into contact with the substantially homogeneous, highly converted mixture in the intermediate zone, a "gorging" effect is generated, resulting in transfer of vinyl-aromatic monomer from the low-converted continuous and dispersed phases just entered to the highly converted dispersed phase already present. It has been observed that after transfer of a certain amount of vinyl-aromatic monomer to the highly converted continuous and dispersed phase, small inclusions of polyvinyl-aromatic compound present in the particles of the highly converted dispersed phase coalesce. Thereupon the walls of the highly converted dispersed particles collapse, resulting in ejection of the coalesced inclusions into the continuous phase of polyvinyl-aromatic compound and vinyl-aromatic compound. This ejection is the cause of a decrease in volume fraction of the dispersed phase, therefore also of a decrease of the gel/rubber ratio and therefore of a decrease in impact strength of the polyvinyl-aromatic compound.

In each of the at least two intermediate zones applied in the process according to the present invention the absolute value of the increase in conversion of vinyl-aromatic monomer is less than in the single intermediate zone applied in the above-described known processes. This low increase in conversion per intermediate zone diminishes the abovedescribed "gorging" effect, so that only a small part, if any, of the small inclusions of vinyl-aromatic compound present in the particles of the highly converted dispersed phase coalesces. Consequently, there are very few particles, if any, of which the walls collapse, so that the volume fraction of the dispersed phase and the gel/rubber ratio are kept at a very satisfactory level and the ultimate polymer has a considerably increased impact strength. As a result, the impact strength is higher according as more consecutive intermediate zones are used.

The single FIGURE is a diagram of an illustrative three zone reactor showing prepolymerization zone (reactor 2), intermediate zone (reactors 4 and 11) and final zone (reactor 18).

DESCRIPTION OF THE PREFERRED EMBODIMENTS

The invention is an improvement of the three zone bulk continuous polymerization process for impact-resistant polyvinyl-aromatic plastic. The three zones are: (1) a pre-polymerization zone, (2) an intermediate zone, and (3) a final zone. The invention relates to increasing the number of reactor stages of the intermediate zone so as to limit the conversion in each of the stages thereby reducing the monomer concentration differences between the polymerizing material as it moves from zone to zone and from stage to stage of the intermediate zone.

THE PRE-POLYMERIZATION ZONE

The pre-polymerization zone is the zone in which the phase inversions take place and the gel particle size is initiated by shear. This zone can comprise one or more reactors. When there are two or more, each reactor can operate under different conditions. The product from each of these reactors is combined to form the polymerization product fed to the first intermediate zone or the reactors are arranged in series so that the polymerization product from the last of the reactors is fed to the first intermediate zone. When the pre-polymerization zone consists of two reactors, the preferred mode is to place them in series. The preferred number of reactors in the pre-polymerization is one.

The stirring in the pre-polymerization reactors must be sufficient to shear particles. The speed of the stirrer necessary to develop this shear is determined by the viscosity of the reaction medium which is a function of the temperature and the conversion level. Polymerization in the pre-polymerization zone may be performed at a temperature between, for example, 50° and 150° C. Particularly impact-resistant polymers are manufactured when the prepolymerization is performed at a temperature in the range of from about 125° to about 140° C.

The total monomer conversion in the pre-polymerization zone can vary between about 16% and about 35%. A preferred total conversion range is from about 20% to about 35% and a particularly preferred range is from about 25% to about 35%. When the pre-polymerization zone is made up of two or more reactor stages in series, the preferred ratio of conversion between the reactor stages is about 1.

THE INTERMEDIATE ZONE

Unlike the intermediate zones of known processes for the polymerization of vinyl aromatic monomers containing elastomers, the intermediate zone of the present invention must have two or more reactors connected to each other and to the pre-polymerization and final zones in a series mode. The maximum practical number of reactors, considering the incremental enhancement in impact strength obtain per reactor, appears to be about four. At this point it is difficult to justify the addition of more reactors because of the relatively small increase in impact strength. The preferred number of reactors in the intermediate zone is two or three, while the most preferred embodiment has three reactors in the intermediate zone.

The maximum monomer conversion taken in the intermediate zone ranges from about 65 to about 85% based on the total amount of monomer initially present. The entering reaction mixture has a conversion level of at least about 15, preferably about 25 and most preferably about 35%. The conversion taken in each of the reactors that make up the intermediate zone may be the same or different. The preferred mode of taking the conversion in the individual reactor is to have them about the same but in no event should the conversions show a relative difference of more than about 25%, preferably not more than about 15%. When the intermediate zone is made up of two reactors the polymerizations is carried to a conversion of from about 45 to about 60% in the first reactor and from about 65 to about 85% in the second reactor. For example, in the process where the intermediate zone comprises four reactors connected in series and the conversion is carried from about 35% to about 85%, each reactor would take approximately 12.5% conversion. Where there are only three reactors in the intermediate zone and the total conversion across this zone is from about 35 to about 80%, each reactor would advance the polymerization about 15%. If the intermediate zone was comprised of only two reactors and the total conversion was from about 35 to about 75%, then each reactor would advance the polymerization by about 20%.

The temperature in the intermediate zone can range from about 125° to about 175° C, preferably about 140° to about 175° C, most preferably from about 140° C to about 160° C.

The intermediate zones are applied in series, but it is possible to use parallel operation of two or more sets of intermediate zones applied in series.

Conveniently, the intermediate reactors are columns or towers of frustoconical form to provide a wider, upper part in which evaporation takes place; in such cases a helical ribbon agitator can be used to provide the necessary mechanical agitation. In a reactor of this form in the absence of an agitator a marked temperature rise occurs down the center of the intermediate reactors which leads to undesirably high temperatures in this region with consequential deterioration in the properties of the ultimate polymer product.

THE FINAL ZONE

The final zone of the polymerization process is an adiabatic, essentially plug-flow reactor in which the conversion is taken to about 85 to about 95%. To attain plug-flow conditions within the final polymerization reactor(s) the operating conditions therein must be quite different from those existing in the intermediate reactors. No back mixing agitation of the final polymerization reactor contents is permissible. Only very slow stirring is allowed, rotating at a speed and with a stirrer blade configuration that will enhance plug-flow. To attain substantially adiabatic conditions within the final polymerization reactor(s) any evaporation of monomer from the reactor contents, which may tend to occur to a small extent at the input end of the reactor, should be reduced to the practicable minimum by operating the preceding intermediate reactor under conditions such that the feed to the final polymerization zone contains only a minor proportion of monomer as represented by a degree of polymerization in this intermediate reactor, equivalent to an overall conversion in the reaction mixture leaving this intermediate reactor of, for example 85%. The final polymerization reactor(s) is (are) conveniently of vertical or horizontal cylinder or tower form. When the vertical form is used, the feed from the preceding intermediate reactor is fed to the top of the final polymerization reactor or to the top of the first final polymerization reactor where two or more are operated in series. The reaction mass flows downwardly through the reactor and advantageously any small amount of monomer (or monomer with traces of any residual diluent when a diluent is employed in the process) which tends to evaporate at the top of the reactor is removed therefrom, i.e., its return as a reflux thereto is avoided as far as is practicable. Such evaporation can be kept to a minimum by operating the reactor in such a manner that it is always substantially full of reaction mass thereby leaving little or no space in which such evaporation can take place. Normally, for the manufacture of polystyrene or a toughened polystyrene it is sufficient to provide only one final polymerization reactor.

If desired, the final polymerization zone may contain a plurality of final polymerization reactors arranged in series or in parallel or in a series-parallel relationship. The temperature in the final zone can range from about 175° to about 225° C, preferably from about 175° C to about 215° C.

Examples of vinyl-aromatic monomers which may be used in the novel process are styrene and nuclear substituted styrenes, for example nuclear alkylated, halogenated and/or nitrated styrenes. Specific examples are o-, m- and p-vinyltoluene, vinylxylenes, isopropylstyrenes, ethylvinylbenzenes, p-chlorostyrene, 2,4-dichlorostyrene, o-, m-, and p-bromostyrene, o-, m- and p-fluorostyrene and p-nitrostyrene. The preferred monomer is styrene. The vinyl-aromatic monomers may be applied as the sole monomer or mixtures of two or more of these monomers may be polymerized. Suitable monomers do not contain in their molecules any nuclear-substituent which would interfere with the polymerization thereof. Compounds containing small amounts of more than one vinyl or vinylidene group, such as divinylbenzene, are tolerated.

The vinyl-aromatic monomer(s) may be copolymerized with a vinylidene-aromatic monomer, for example, alpha-methylstyrene, alpha-ethylstyrene and p-methyl-alpha-methylstyrene, and/or with another ethylenically unsaturated monomer copolymerizable with a vinyl-aromatic monomer, for example, acrylic acid, methacrylic acid, acrylonitrile, methacrylonitrile, maleic acid, maleic anhydride and the (cyclo) alkyl esters of these three acids containing one (for cycloalkyl three) to eighteen carbon atoms in the (cyclo)alkyl group, such as butyl acrylate, 2-ethylhexyl acrylate, cyclohexyl acrylate, methyl methacrylate and butyl methacrylate.

The elastomeric polymer may be a natural or a synthetic rubber. Examples of synthetic rubbers are polydiene elastomers, for example, of conjugated 1,3-dienes having four, five or six carbon atoms per molecule, such as butadiene and isoprene.

While any polybutadiene rubber, for example, a rubber of the kind known under the trade designation "Plioflex 5000-S" can be used in carrying out the novel process, the stereoregular cis-polybutadiene rubbers, in particular those with a cis-1,4 content of greater than 20%, may be preferred. Examples of such stereoregular cis-polybutadiene rubbers are the so-called medium cis-1,4 rubbers, i.e., polybutadiene rubbers with a medium cis-1,4 content, for example, the rubbers known under the trade designations "Diene 35" and "Diene 55NF" which have cis-1,4-contents of about 40%; and the so-called high cis-1,4 rubbers, i.e., polybutadiene rubbers with a high cis-1,4 content, for example, the polybutadiene rubber known under the trade designation "Taktene" 1202 which has a cis-1,4 content greater than 90% and the polybutadiene rubber known under the trade designation "Cariflex" BR which has a cis-1,4 content of greater than 96%. However, the use of low cis-1,4 polybutadiene rubbers in carrying out the present invention is not excluded. Copolymers of these conjugated 1,3-dienes may be used, for example, those derived from styrene, acrylonitrile and alkyl esters of acrylic acid and methacrylic acid having from one to eighteen carbon atoms per alkyl group. Other examples of synthetic rubbers are block copolymers containing a polydiene or hydrogenated polydiene block in its molecular structure, for example, a styrene-butadiene-styrene block copolymer rubber. Again other examples are elastomers obtained by polymerization of cyclopentene; by copolymerization of ethylene and propene and of isobutene with isoprene (butyl rubber); by polymerization of 2-chloro1,3-butadiene(neoprene); polysulfide polymers prepared by reaction of a suitable organic dihalide with an aqueous solution of sodium polysulfide; acrylic polymers, for example, based on ethyl and/or butyl acrylate; silicone elastomers; elastomers made by the chlorosulphonation of polyethylene (the so-called "HYPALON" synthetic rubbers); fluorocarbon elastomers; polyurethane elastomers. Mixtures of the said elastomeric polymers may be applied. Preferred mixtures are mixtures of polybutadiene and polyisoprene. The preferred rubbers are the polybutadiene and butadiene/styrene copolymers; the medium and high cis polybutadienes are most preferred.

The concentration of elastomeric polymer in the vinyl-aromatic monomer fed to the pre-polymerization zone is usually between 1 and about 15%, calculated on the total feed, preferably between about 1 and about 10% and most preferably between about 2 and about 8%.

If desired the starting solution and/or the pre-polymer can include a conventional lubricant, for example, butyl stearate or a white oil. Particularly suitable white oils are those sold under the trade designation "Risella" Oil, for example, the white oil known as "Risella" 33 which has a viscosity at 100° F in the range 64.7 to 80 centistokes. If desired, a mixture of lubricants may be used, for example, a mixture of butyl stearate and "Risella" 33. In general, the amount of lubricant present in the ultimate polymer composition is conveniently from about 0.25 to about 10% by weight, preferably from about 0.5 to about 6% by weight. The content of lubricant has an influence on the softening point and the melt index of the polyvinyl-aromatic compound.

In the embodiments where an optional hydrocarbon diluent is used, this can be added to the starting mixture fed to the pre-polymerization zone and/or mixed with the polymerization product from the pre-polymerization zone before its entry into the first intermediate zone and/or to the polymerization product from an intermediate zone before its entry into the next intermediate zone. A suitable diluent is a non-polymerizable cycloaliphatic or aromatic hydrocarbon having a boiling point below that of the vinyl-aromatic monomer. Examples of such diluents are benzene, toluene, o—, m— and p-xylene, ethylbenzene and cyclohexane and mixtures of any of these hydrocarbons, in any ratio. The preferred diluents are toluene and ethyl benzene, toluene being the most preferred. The amount of diluent used will depend on the polymerization temperature, the degree of cross-linking and conversion to be adopted and can be between, for example, about 1% and about 20%, preferably between about 2% and about 15% by weight, calculated on starting vinyl-aromatic monomer. Any residual diluent which remains in the reaction mixture fed to the final polymerization reactor can be removed, together with any residual monomer, for example, in a devolatilizing extruder, a wiped film evaporator or a falling strand devolatilizer, in which the ultimate polymer product is converted into solid, particulate form having less the 0.5 weight percent monomer plus diluent by extruder or melt pumps for supply to end-users.

The invention is further illustrated with reference to the accompanying FIGURE which is a schematic representation of a continuous process for manufacturing a toughened polystyrene. This process starts from a solution of, for example, 2 to 10% by weight of an unvulcanized elastomer such as a butadiene rubber in styrene monomer. If desired, the starting solution can also contain a minor amount of a lubricant or flow promoter such as a mineral oil, a liquid ester or paraffin wax, and/or a catalyst such as a peroxide, for example, benzoyl peroxide or ditert-butyl peroxide in amounts between 0.01 and 1% by weight of the starting solution, and/or a stabilizer or antioxidant for the elastomer.

Referring to the FIGURE, a starting solution comprising styrene monomer and elastomeric polymer is fed through a line 1 to a pre-polymerization zone comprising a reactor 2. The reactor 2 is an agitated, jacketed reactor in which polymerization is performed at a temperature of, for example, 125° to 135° C. The overall conversion in the reactor 2 can be, for example, between 25 and 35%. The polymerization product from the reactor 2 is withdrawn via a line 3 and fed to the top of an intermediate zone comprising a first intermediate reactor 4. Reactor 4 is stirred reactor in which polymerization continues at a temperature of, for example, between 140° C and 150° C to a conversion of, for example, between about 45 and about 60%. During polymerization in the reactor 4 evaporation of styrene monomer occurs and the monomer vapor is removed through a line 5 to a condenser 6 in which it condenses; the resulting condensate passes to a storage vessel 7 from which it is fed back to the first intermediate reactor 4 via a line 8. If it is desired to use a hydrocarbon diluent to aid heat removal in the reactor 4, this is supplied via a line 9. The polymerization mixture in reactor 4 is withdrawn through a line 10 and fed to the top of a second intermediate zone comprising a second intermediate reactor 11. Reactor 11 is a stirred reactor in which polymerization continues at a temperature of, for example, between 140° and 150° C to a conversion of, for example, between about 65 and about 85%. During polymerization in the reactor 11 evaporation of styrene monomer occurs and the monomer vapor is removed through a line 12 to a condenser 13 in which it condenses; the resulting condensate passes to a storage vessel 14 from which it is fed back to the second intermediate reactor 11 via a line 15. If it is desired to use a hydrocarbon diluent to aid heat removal in the reactor 11, this is supplied via a line 16. The polymerization mixture in the second intermediate reactor 11 is withdrawn through line 17 and fed to a final polymerization zone consisting of a final polymerization reactor 18 which is operated substantially liquid full so that polymerization proceeds therein to a final conversion of, for example, 92-96% under adiabatic, plug-flow conditions. In operation, the reaction mass moves slowly down the final polymerization reactor 18 and the temperature of the mass increases gradually and smoothly, for example, from 175° C to 215° C, with little or no local overheating. The final product is removed from the base of the final polymerization reactor 18 and conducted via a line 19 to a devolatilizing extruder 20 in which residual styrene monomer, and traces of the hydrocarbon diluent if used, are removed through a line 21. The toughened polystyrene is withdrawn from the extruder 20 via a line 22.

The novel process is further illustrated by the following illustrative embodiments. These illustrative embodiments are for illustration only and should not be taken as a limitation on the scope of the invention.

ILLUSTRATIVE EMBODIMENT I a. Five samples of impact-resistant polystyrene were manufactured according to the process described with reference to the accompanying drawings, starting from five solutions— A, B, C, D and E — of CARIFLEX BR 1202 in styrene monomer. CARIFLEX BR 1202 is a stereospecific high cis-1,4 polybutadiene elastomer. A typical figure for the content of cis-1,4 units is 96.5. The five solutions had the compositions stated in Table I.

b. By way of comparison the polymerization described in section (a) was repeated under as near identical conditions as possible with the starting solutions A, C', D' and E', except that the second intermediate zone was taken out of service and the first intermediate zone was connected directly to the final zone. The compositions of solutions C', D' and E' are stated in Table I. The residence time in this single intermediate zone was 4 hours. The styrene conversion in this zone was 75%.

TABLE I

|  | % By weight | | | | | | | |
|---|---|---|---|---|---|---|---|---|
|  | A | B | C | D | E | C' | D' | E' |
| Styrene | 86.3 | 86.9 | 95.6 | 91.2 | 90.4 | 94.7 | 90.3 | 88.9 |
| "CARIFLEX" BR 1202 | 5.6 | 5.0 | 3.3 | 4.7 | 8.5 | 4.2 | 5.6 | 10.0 |
| Mineral white oil (RISELLA "33")[1] | 8.0 | 8.0 | 1.0 | 4.0 | 1.0 | 1.0 | 4.0 | 1.0 |
| "IONOL" Antioxidant[2] | 0.1 | 0.1 | 0.1 | 0.1 | 0.1 | 0.1 | 0.1 | |

[1] "RISELLA" 33 has a viscosity at 100° F in the range 64.7 to 80 cSt.
[2] "IONOL" is 2,6-ditert-butyl-p-cresol, an antioxidant.

Table II states the conditions under which the process was performed and the conversions of styrene monomer. A shear rate of 37 sec$^{-1}$ was applied in the pre-polymerization reactor.

TABLE II

|  | Pre-polymerization reactor | Intermediate reactors | | final polymerization reactor |
|---|---|---|---|---|
|  |  | first | second |  |
| stirring speed rev/min | 30 | 1.5 | 1.5 | no stirring |
| temperature, ° C | 130 | 150 | 150 | 210 |
| residence time, hours | 1.8 | 1.1 | 1.8 | 2 |
| conversion, % | 30 | 50 | 75 | 93 |

Some properties of the resulting toughened polystyrene from (a) are presented in Table III, first five lines of figures. The gel content and the swell index have been determined as described in U.S. Pat. No. 3,243,481.

TABLE III

| Starting solution | Rubber content % | Gel/rubber ratio | Swell index | Intrinsic viscosity at 25° C dl/g | Izod impact strength at 20° C, BS 3126 (1959) Joule/ 6.4 mm of notch length | Softening point BS 2782 method 102 C ° C | Melt index ASTM D-1238-65 g/10 min. 200° C, 5 kgm load, condition G |
|---|---|---|---|---|---|---|---|
| A | 5.6 | 2.6 | 12 | 0.70 | 0.52 | 80 | 17 |
| B | 5.0 | 2.6 | 12 | 0.70 | 0.45 | 82 | 18 |
| C | 3.3 | 2.9 | 11 | 0.71 | 0.30 | 97 | 4 |
| D | 4.7 | 2.8 | 12 | 0.73 | 0.40 | 86 | 11 |
| E | 8.5 | 2.5 | 11 | 0.71 | 0.58 | 97 | 4 |
| A | 5.6 | 2.3 | 12 | 0.70 | 0.40 | 80 | 17 |
| C' | 4.2 | 2.6 | 11 | 0.71 | 0.31 | 97 | 4 |

TABLE III-continued

| Starting solution | Rubber content % | Gel/rubber ratio | Swell index | Intrinsic viscosity at 25° C dl/g | Izod impact strength at 20° C, BS 3126 (1959) Joule/ 6.4 mm of notch length | Softening point BS 2782 method 102 C ° C | Melt index ASTM D-1238-65 g/10 min. 200° C, 5 kgm load, condition G |
| --- | --- | --- | --- | --- | --- | --- | --- |
| D' | 5.6 | 2.2 | 12 | 0.72 | 0.40 | 86 | 11 |
| E' | 10.0 | 2.0 | 11 | 0.71 | 0.43 | 96 | 5 |

Some properties of the resulting toughened polystyrene from (b) are presented in Table III, bottom four lines of figures. Comparison of the results presented shows a higher impact strength for the same rubber content — compare solutions A — the use of less rubber for the same impact strength — compare solutions C, C' and D, D' — and the use of less rubber for a higher impact strength — compare solutions E and E'.

We claim as our invention:

1. In the continuous process for the manufacture of an impact-resistant polyvinyl-aromatic compound by the bulk polymerization of a solution of a vinyl-aromatic monomer in admixture with an elastomeric polymer and in the optional presence of up to 20% by weight of hydrocarbon diluent, calculated on the starting vinyl-aromatic monomer, where said solution is successively passed through an agitated pre-polymerication zone, a backmixed intermediate polymerization zone and an unstirred final polymerization zone, the improvement which comprises reacting said solution in an intermediate zone having from 2 to 4 reactors, inclusive, wherein the reaction mixture is maintained in each reactor in substantially homogeneous condition by agitation, and heat of polymerization is removed from each reactor by evaporation of vaporizable components of the mixture, and wherein the monomer conversion in said intermediate zone is advanced from a range of about 20% to about 35% entering the first intermediate reactor to a range of about 65% to about 85% leaving the last intermediate reactor, and controlling the conversion in said intermediate zone so that the difference in the percent of conversion in successive reactors in said zone does not exceed 25%.

2. The process of claim 1 where the intermediate zone comprises 3 reactors.

3. The process of claim 1 where the intermediate zone comprises 2 reactors.

4. The process of claim 3 where the vinyl-aromatic monomer is styrene.

5. The process of claim 4 where the elastomeric polymer is a polybutadiene having a cis content of greater than about 40%.

6. The process of claim 5 where the hydrocarbon diluent is toluene.

7. The process of claim 6 where the temperatures of the reactors of the intermediate zone are maintained by evaporation between about 140° and about 160° C.

* * * * *